(12) United States Patent
Machado et al.

(10) Patent No.: US 12,513,140 B2
(45) Date of Patent: Dec. 30, 2025

(54) MULTIFACTOR ACCESS AUTHENTICATOR

(71) Applicant: Lenovo (Singapore) Pte. Ltd., Singapore (SG)

(72) Inventors: Rafael Rodrigues Machado, Sorocaba (BR); Scott Li, Cary, NC (US); Igor Stolbikov, Apex, NC (US); Nathan Peterson, Oxford, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 125 days.

(21) Appl. No.: 18/389,488

(22) Filed: Nov. 14, 2023

(65) Prior Publication Data

US 2025/0158982 A1 May 15, 2025

(51) Int. Cl.
*H04L 9/40* (2022.01)
*H04L 9/30* (2006.01)

(52) U.S. Cl.
CPC ........ *H04L 63/0838* (2013.01); *H04L 9/3066* (2013.01)

(58) Field of Classification Search
CPC .................. H04L 63/0838; H04L 9/3066
See application file for complete search history.

(56) References Cited

U.S. PATENT DOCUMENTS

| | | | | |
|---|---|---|---|---|
| 2014/0164781 A1* | 6/2014 | Joshi | ............. | H04L 9/3271 713/184 |
| 2016/0335438 A1* | 11/2016 | Dadu | ............. | G06F 21/34 |
| 2024/0037283 A1* | 2/2024 | Chen | ............. | G06F 21/64 |

* cited by examiner

*Primary Examiner* — Thaddeus J Plecha
(74) *Attorney, Agent, or Firm* — Schwegman Lundberg & Woessner, P.A.

(57) ABSTRACT

A computer implemented method includes receiving, at device that includes a locked basic input/output system (BIOS), a support service generated one-time code based on a private key and a support service counter, validating the device one-time code based on a public key associated with the private key and a device counter, and unlocking the BIOS of the device using the device one-time code.

18 Claims, 3 Drawing Sheets

MULTIFACTOR ACCESS AUTHENTICATOR

BACKGROUND

At present, there exists an issue pertaining to the repair of Notebook and desktop devices upon their arrival at repair centers, specifically concerning devices that have a basic input/output system (BIOS) password known as the Supervisor Password (SVP). Users often forget or are unaware of their BIOS passwords. As a result, repair centers face challenges in running diagnostic tools and implementing necessary fixes on these systems. In some cases, the only viable solution is to replace the entire PCB (Printed Circuit Board)

The widespread problem of "Password lost" among end users and repair centers contributes to difficulties in device repairability and potential compromise of security measures. Most of the solutions rely on either an unlocked bios with no bios protection or recommendations for the user to write down the password and then find the password when needed.

SUMMARY

A computer implemented method includes receiving, at device that includes a locked basic input/output system (BIOS), a support service generated one-time code based on a private key and a support service counter, validating the device one-time code based on a public key associated with the private key and a device counter, and unlocking the BIOS of the device using the device one-time code.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The term, BIOS, is used to describe software that is usually stored in firmware of a device and operates as an interface between an operating system or other code, and processing circuitry, such as a processor. BIOS is used to start up the device on power on, checking to make sure the hardware is operating properly, locate the operating system, software, and drivers used to make the device operate properly. BIOS also manages data flow between the operating system and other devices, such storage devices, keyboards, printers, and video adapters to name a few.

Repair of computer devices may be facilitated by use of an improved BIOS based multiple factor authentication (MFA) to unlock the BIOS and allow access to supervisor functions of BIOS. Such supervisor functions provide access to BIOS beyond that given to general applications. While supervisor functions may be accessed via a supervisor password, users may not remember the supervisor password. The improved BIOS based MFA enables access to supervisor functions of BIOS without the need to remember the supervisor password.

Figure 1:
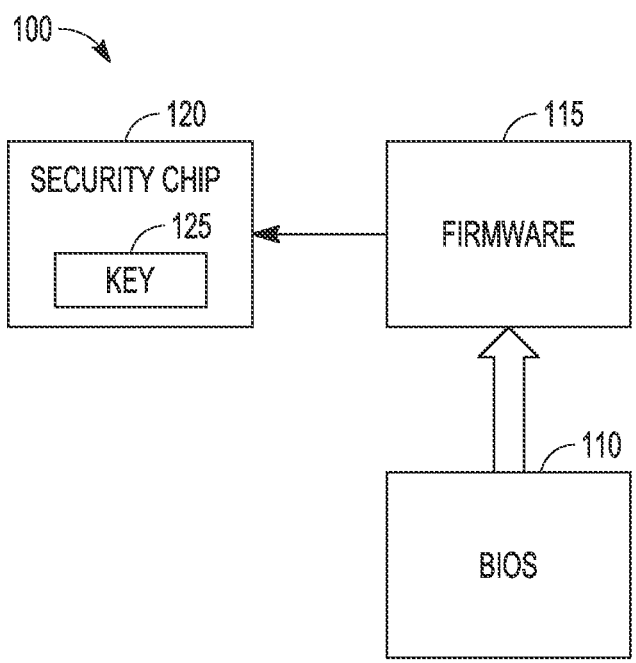
FIG. 1 is a block diagram of a device that includes a locked BIOS, firmware, and a security chip according to an example embodiment.

FIG. 1 is a block diagram of a device 100 that includes a BIOS 110, firmware 115, and a security chip 120. BIOS 110 may be stored on memory of firmware 115 in one example. The security chip 120 includes information identifying the device 100, such as a device serial number and machine type, or other information identifying the device 100. Security chip 120 may also include a public key 125 that was generated by registering the device with a support service containing a corresponding private key from which the public key 125 was generated. The BIOS 110 may be locked via the firmware 115 upon registering the device in one example using the received public key.

To unlock the BIOS 110, the support service may be contacted by an authorized user of the support service that provides the information identifying the device 100. The support service may generate a one-time code that can be entered into the device 100 and processed by the firmware, using the information in the security chip 120, including the public key 125, to validate the one-time code and unlock the BIOS 110. In one example, the one-time code is a time limited one-time code, which means that the time limited one-time code is only able to be used to unlock the BIOS 110 for a limited time, such as 30 seconds or a minute or two. Further time limits may be used in further examples.

Figure 2:
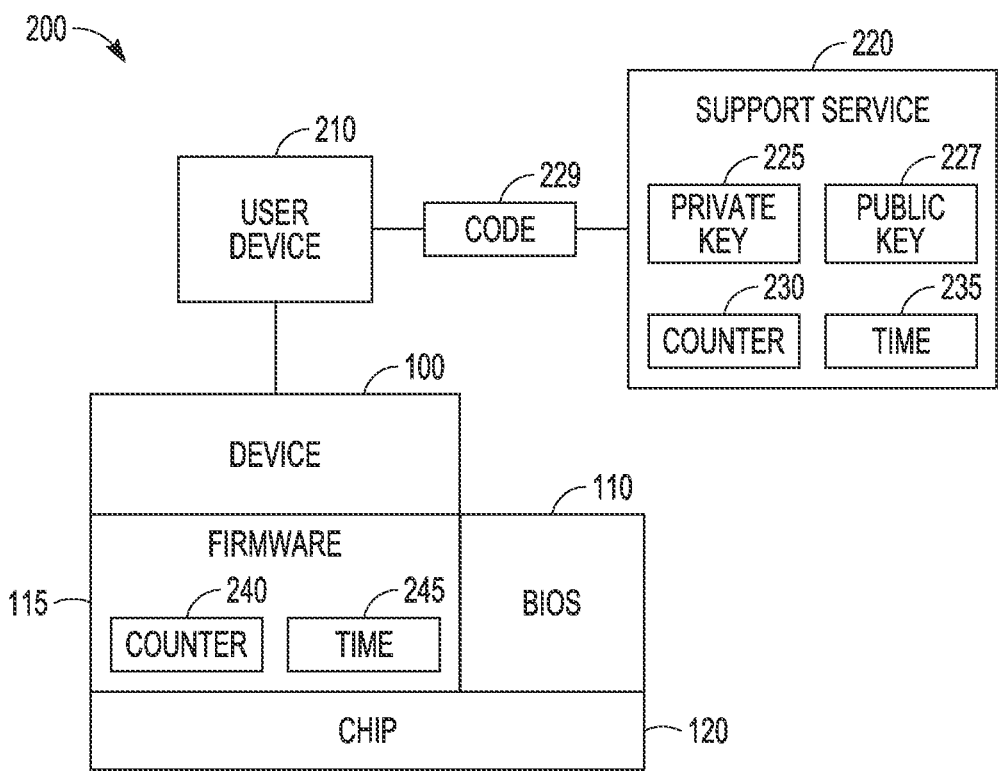
FIG. 2 is a block diagram illustrating a distributed system for providing BIOS based MFA for unlocking BIOS according to an example embodiment.

FIG. 2 is a block diagram illustrating a distributed system 200 for providing BIOS based MFA for unlocking BIOS 110. In one example, a user device 210, such as a mobile device may be used to register the device 100 with a support service 220. Registration may be performed by providing device 100 identifying information to the support service by an authenticated user of the device 210. In one example, the authenticated user is a purchaser of device 100 who may be authenticated in many different ways using user identifying information, such as an ID and password established during or after purchase of the device 100.

Support service 220 may be implemented on a cloud based platform in one example. Support service 220 has knowledge of device 100 firmware stored public key 125 associated with the device identifying information, such as the device serial number (SN) and machine type (MT), as well as device and user attributes for validating a user accessing support service 220.

Support service 220 receives the identifying information and using a private key 225 and a form of cryptography, such as Elliptic curve cryptography, generates a public key 227. The public key 227 may be generated based on the device 100 cryptographic identity, private key, and user attributes.

In one example, private key 225 may be specific to device 100, as is the public key 227. The public key 227 may be provided via the user device 210 to the device 100, either by a network connection to device 100, or manually entered by the user of the user device 210. The public key 227 in device 100 is stored as public key 125 in security chip 120. In one example, the public key 227 may be generated during manufacture, prior to transfer of the device 100 to the purchaser/user and stored in the firmware 115.

When a need arises to login to or unlock the BIOS a one-time code 229 may be issued to the user device 210 by the support service 220 in response to the support service 220 being accessed by an authorized user and the provision of device 100 identifying information. The one-time code 229 may be time limited in one example. The one-time code 229 may be generated based on a counter 230 that increments with each one-time code generation. A clock 235 may be used to provide a time, which may also be viewed as a counter in one example. The user may enter the one-time code into the device 100. The device firmware 115 will utilize the public key to verify that the one-time code 229 is valid, and unlock the BIOS, allowing the user to access supervisor functions of the BIOS. The firmware 115 may also include a counter 240 or clock 245, which may be synchronized with the counter 230 and clock 235 of support service 220 to ensure the same information is used in validating the one-time code 229.

In one example, the device 100 does not need to be network connected in order to unlock BIOS 110. After the laptop purchase user can sign up for the BIOS protection services via support service 220. After successful authentication of the user and secure device registration, the user will be registered as the owner of the device 100. Bios 110 will be locked to everybody except the authorized user or a user having a valid authentication code.

To unlock the device 100 BIOS 110, the cryptographic one-time code or token will be issued to the authorized user via support service 220 to unlock the BIOS 110.

The code is calculated by using device public key 227 and private key 225 in support service 220 and can only be verified by device 100. If device 100 is owned by an organization, the one-time BIOS access codes or tokens can be issued to an organization administrator.

If the device 100 is in the repair shop, the one-time BIOS access code can be issued to a repair center representative if authorized by the device owner, or even forwarded to the repair center representative by the device owner from user device 210.

In one example, the one-time code may be generated out of public key 227 and private key 225 using an ECDH function as: OTP (ECDH (device account public key, cloud private key)) authenticated code.

For validation, the device 100, after the receiving the one-time code validates the one-time code in reverse: one-time code (ECDH (device private key, cloud public key)), wherein the one-time code may be a time limited one-time code, a HOTP (hash based one-time function based on counter) or both.

Figure 3:
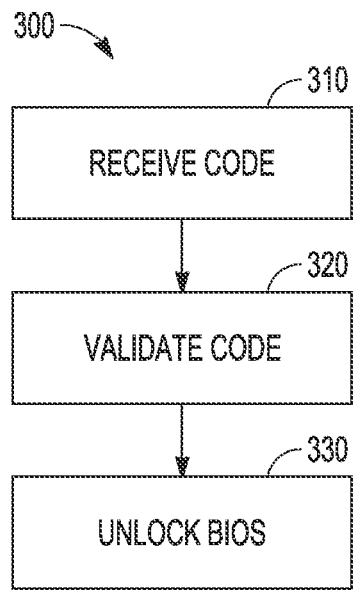
FIG. 3 is a flowchart illustrating a method of unlocking BIOS according to an example embodiment.

FIG. 3 is a flowchart illustrating a method 300 of unlocking BIOS. Method 300 begins at operation 310 by receiving, at the device 100 that includes a locked basic input/output system (BIOS) 115, a support service generated one-time code based on a private key and a support service counter. Operation 320 validates the device one-time code based on a public key associated with the private key and a device counter. The BIOS of the device is unlocked at operation 330 using the device one-time code 229.

Figure 4:
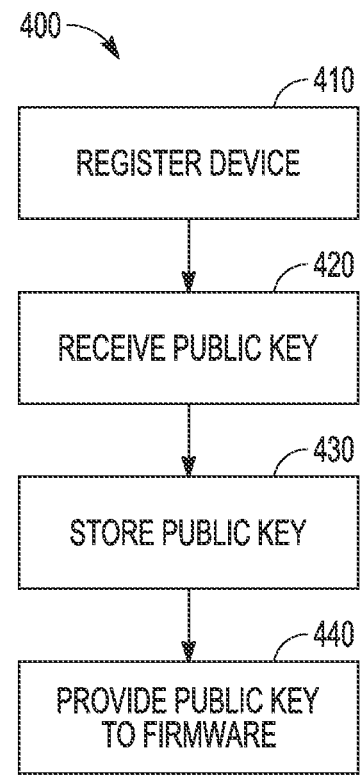
FIG. 4 is a flowchart illustrating a method of setting up BIOS MFA authentication with a support service according to an example embodiment.

FIG. 4 is a flowchart illustrating a method 400 of setting up BIOS MFA authentication with the support service 220. Method 400 beings at operation 410 by registering the device with the support service based on a device serial number and machine type. At operation 420, the public key is received from the support service. and is stored on a security chip of the device at operation 430. The support service generated one-time key is provided at operation 440 to firmware of the device.

Figure 5:
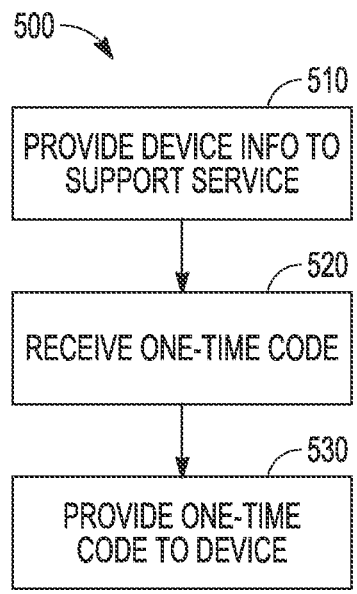
FIG. 5 is a flowchart illustrating a method of obtaining and utilizing a one-time code to unlock BIOS according to an example embodiment.

FIG. 5 is a flowchart illustrating a method 500 of obtaining and utilizing a one-time code to unlock the BIOS. Method 500 begins at operation 510 by providing a device serial number and machine type to the support service via a mobile app. The support service generated one-time code is received at the mobile app at operation 520. At operation 530, the one-time code is provided to by a user of the mobile app.

Figure 6:
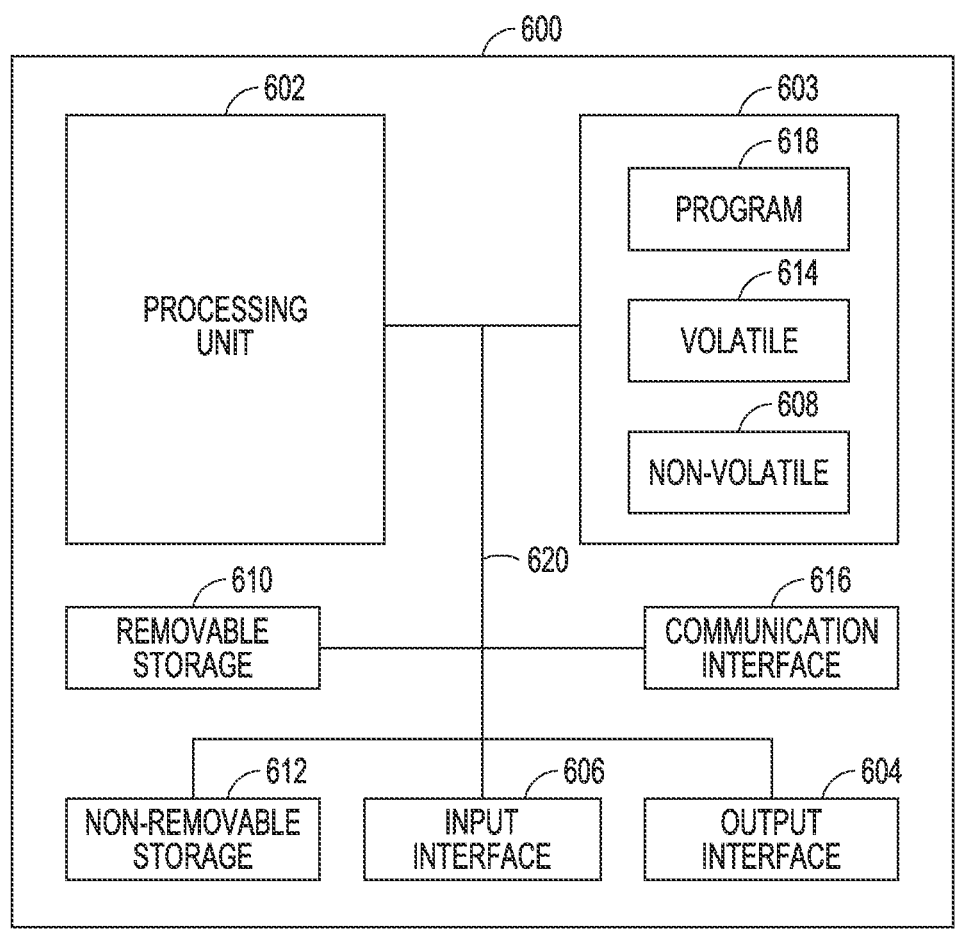
FIG. 6 is a block schematic diagram of a computer system to implement one or more example embodiments.

FIG. 6 is a block schematic diagram of a computer system 600 to implement one or more of the support service, user device, and device, and for performing methods and algorithms including cryptographic functions and validation according to example embodiments. All components need not be used in various embodiments.

One example computing device in the form of a computer 600 may include a processing unit 602, memory 603, removable storage 610, and non-removable storage 612. Although the example computing device is illustrated and described as computer 600, the computing device may be in different forms in different embodiments. For example, the computing device may instead be a smartphone, a tablet, smartwatch, smart storage device (SSD), or other computing device including the same or similar elements as illustrated and described with regard to FIG. 6. Devices, such as smartphones, tablets, and smartwatches, are generally collectively referred to as mobile devices or user equipment.

Although the various data storage elements are illustrated as part of the computer 600, the storage may also or alternatively include cloud-based storage accessible via a network, such as the Internet or server-based storage. Note also that an SSD may include a processor on which the parser may be run, allowing transfer of parsed, filtered data through I/O channels between the SSD and main memory.

Memory 603 may include volatile memory 614 and non-volatile memory 608. Computer 600 may include—or have access to a computing environment that includes—a variety of computer-readable media, such as volatile memory 614 and non-volatile memory 608, removable storage 610 and non-removable storage 612. Computer storage includes random access memory (RAM), read only memory (ROM), erasable programmable read-only memory (EPROM) or electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 600 may include or have access to a computing environment that includes input interface 606, output interface 604, and a communication interface 616. Output interface 604 may include a display device, such as a touchscreen, that also may serve as an input device. The input interface 606 may include one or more of a touchscreen, touchpad, mouse, keyboard, camera, one or more device-specific buttons, one or more sensors integrated within or coupled via wired or wireless data connections to the computer 600, and other input devices. The computer may operate in a networked environment using a communication connection to connect to one or more remote computers, such as database servers. The remote computer may include a personal computer (PC), server, router, network PC, a peer device or other common data flow network switch, or the like. The communication connection may include a Local Area Network (LAN), a Wide Area Network (WAN), cellular, Wi-Fi, Bluetooth, or other networks. According to one embodiment, the various components of computer 600 are connected with a system bus 620.

Computer-readable instructions stored on a computer-readable medium are executable by the processing unit 602 of the computer 600, such as a program 618. The program 618 in some embodiments comprises software to implement one or more methods described herein. A hard drive, CD-ROM, and RAM are some examples of articles including a non-transitory computer-readable medium such as a storage device. The terms computer-readable medium, machine readable medium, and storage device do not include carrier waves or signals to the extent carrier waves and signals are deemed too transitory. Storage can also include networked storage, such as a storage area network (SAN). Computer program 618 along with the workspace manager 622 may be used to cause processing unit 602 to perform one or more methods or algorithms described herein.

EXAMPLES

1. A computer implemented method includes receiving, at the device that includes a locked basic input/output system (BIOS), a support service generated one-time code based on a private key and a support service counter, validating the device one-time code based on a public key associated with the private key and a device counter, and unlocking the BIOS of the device using the device one-time code.

2. The method of example 1 wherein the support service key includes a private key.

3. The method of example 2 wherein the public key and private key include elliptic curve credentials.

4. The method of any of examples 1-3 wherein the device one-time code is time limited.

5. The method of any of examples 1-4 wherein the support service counter and the device counter includes time stamps.

6. The method of any of examples 1-5 wherein receiving the support service generated one-time code includes registering the device with the support service based on a device serial number and machine type, receiving the public key from the support service, storing the public key on a security chip of the device, and providing the support service generated one-time key to firmware of the device.

7. The method of example 6 wherein the device one-time code is generated by the firmware of the device.

8. The method of example 7 wherein the firmware of the device performs the validating of the support service one-time code and the unlocking of the BIOS.

9. The method of any of examples 1-8 and further including providing a device serial number and machine type to the support service via a mobile app, receiving at the mobile app, the support service generated one-time code, and wherein receiving the support service generated one-time code at the device includes receiving the support service generated one-time code from a user of the mobile app.

10. A computer implemented method includes receiving, at a device that includes a locked basic input/output system (BIOS), a support service generated one-time code based a support service key and a support service time stamp, generating a device one-time code based a public key associated with the support service key and a device time stamp, validating the device one-time code with the support service generated one-time code, and unlocking a BIOS of the device using the device one-time code.

11. A computer implemented method includes receiving, at a device that includes a locked basic input/output system (BIOS), a support service generated one-time code based a support service key and a support service counter, validating the device one-time code based on a public key and a device counter, and unlocking a BIOS of the device using the device one-time code.

12. A computer implemented method includes registering a device utilizing a basic input/output system (BIOS) with a support service system, receiving a public key associated with the device from the support service system, locking the BIOS using the public key, receiving a one-time code based on the public key and a time representation at the device, and unlocking the BIOS using the one-time code.

13. A computer implemented method includes receiving a public key associated with the device from a support service system, locking the BIOS using the public key, receiving a one-time code based on the public key and a time representation at the device, and unlocking the BIOS using the one-time code.

14. A machine-readable storage device having instructions for execution by a processor of a machine to cause the processor to perform operations to perform any of the methods of example 1-13.

15. A device includes a processor and a memory device coupled to the processor and having a program stored thereon for execution by the processor to perform operations to perform any of the methods of example 1-13.

16. A device includes a processor, a lockable basic input/output system (BIOS) configured to boot the processor, firmware configured to execute cryptography functions, and a security chip coupled to provide the firmware a public key to validate, via the firmware cryptography functions, a received one time code generated with use of a private key based on registration of the device with a support server to enable the firmware to unlock the BIOS.

17. The device of example 16 and further comprising a device counter synchronized with a support server counter and used by the firmware along with the received one time code to enable the firmware to unlock the BIOS.

18. The device of device of example 17 wherein the support service counter and the device counter includes time stamps.

19. The device of device of any of examples 16-18 wherein the public key and private key includes elliptic curve credentials.

20. The device of device of any of examples 16-19 wherein the received one-time code is time limited.

The functions or algorithms described herein may be implemented in software in one embodiment. The software may consist of computer executable instructions stored on computer readable media or computer readable storage device such as one or more non-transitory memories or other type of hardware-based storage devices, either local or networked. Further, such functions correspond to modules, which may be software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system, turning such computer system into a specifically programmed machine.

The functionality can be configured to perform an operation using, for instance, software, hardware, firmware, or the like. For example, the phrase "configured to" can refer to a logic circuit structure of a hardware element that is to implement the associated functionality. The phrase "configured to" can also refer to a logic circuit structure of a hardware element that is to implement the coding design of associated functionality of firmware or software. The term "module" refers to a structural element that can be implemented using any suitable hardware (e.g., a processor, among others), software (e.g., an application, among others), firmware, or any combination of hardware, software, and firmware. The term, "logic" encompasses any functionality for performing a task. For instance, each operation illustrated in the flowcharts corresponds to logic for performing that operation. An operation can be performed using, software, hardware, firmware, or the like. The terms, "component," "system," and the like may refer to computer-related entities, hardware, and software in execution, firmware, or combination thereof. A component may be a process running on a processor, an object, an executable, a program, a function, a subroutine, a computer, or a combination of software and hardware. The term, "processor," may refer to a hardware component, such as a processing unit of a computer system.

Furthermore, the subject matter may be implemented as a method, apparatus, or article of manufacture using standard programming and engineering techniques to produce software, firmware, hardware, or any combination thereof to control a computing device to implement the disclosed subject matter. The term, "article of manufacture," as used herein is intended to encompass a computer program accessible from any computer-readable storage device or media. Computer-readable storage media can include, but are not limited to, magnetic storage devices, e.g., hard disk, floppy disk, magnetic strips, optical disk, compact disk (CD), digital versatile disk (DVD), smart cards, flash memory devices, among others. In contrast, computer-readable media, i.e., not storage media, may additionally include communication media such as transmission media for wireless signals and the like.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A computer implemented method comprising:
receiving, at a device that includes a locked basic input/output system (BIOS), a device one-time code generated by a support service based on a private key and a support service counter;
validating the device one-time code based on a public key associated with the private key and a device counter; and
unlocking the BIOS of the device using the device one-time code.

2. The method of claim 1 wherein the public key and private key comprise elliptic curve cryptography credentials.

3. The method of claim 1 wherein the device one-time code is time limited.

4. The method of claim 1 wherein the support service counter and the device counter comprises time stamps.

5. The method of claim 1 wherein receiving the one-time code comprises:
registering the device with the support service based on a device serial number and machine type;
receiving the public key from the support service;
storing the public key on a security chip of the device; and
providing the one-time code to firmware of the device.

6. The method of claim 5 wherein the device one-time code is generated by the firmware of the device.

7. The method of claim 6 wherein the firmware of the device performs the validating of the device one-time code and the unlocking of the BIOS.

8. The method of claim 1 and further comprising:
providing a device serial number and machine type to the support service via a mobile app;
receiving at the mobile app, the device one-time code; and
wherein receiving the device one-time code at the device comprises receiving the device one-time code from a user of the mobile app.

9. A device comprising:
a processor,
a lockable basic input/output system (BIOS) configured to boot the processor;
firmware configured to execute cryptography functions; and
a security chip coupled to the firmware to provide the firmware a public key to validate, via the firmware cryptography functions, a received one-time code generated with use of a private key based on registration of the device with a support server to enable the firmware to unlock the BIOS.

10. The device of claim 9 and further comprising a device counter synchronized with a support service counter and used by the firmware along with the received one time-code to enable the firmware to unlock the BIOS.

11. The device of claim 10 wherein the support service counter and the device counter comprises time stamps.

12. The device of claim 9 wherein the public key and private key comprise elliptic curve credentials.

13. The device of claim 9 wherein the received one-time code is time limited.

14. A device comprising:
a processor, and
a memory device coupled to the processor and having a program stored thereon for execution by the processor to perform operations comprising:
receiving, at a device that includes a locked basic input/output system (BIOS), a device one-time code generated by a support service based on a private key and a support service counter;
validating the device one-time code based on a public key associated with the private key and a device counter; and
unlocking the BIOS of the device using the device one-time code.

15. The device of claim 14 wherein the public key and private key comprise elliptic curve credentials and the device one-time code is time limited.

16. The device of claim 14 wherein receiving the one-time code comprises:
registering the device with the support service based on a device serial number and machine type;
receiving the public key from the support service;
storing the public key on a security chip of the device; and
providing the one-time code to firmware of the device.

17. The device of claim 14 wherein the operations further comprise:

providing a device serial number and machine type to the support service via a mobile app;

receiving at the mobile app, the device one-time code; and wherein receiving the device one-time code at the device comprises receiving the device one-time code from a user of the mobile app.

18. A non-transitory machine-readable storage device having instructions for execution by a processor of a machine to cause the processor to perform operations to perform a method, the operations comprising:

receiving, at a device that includes a locked basic input/output system (BIOS), a device one-time code generated by a support service based on a private key and a support service counter;

validating the device one-time code based on a public key associated with the private key and a device counter, and unlocking the BIOS of the device using the device one-time code.

* * * * *